US008190552B2

(12) United States Patent
Kim et al.

(10) Patent No.: US 8,190,552 B2
(45) Date of Patent: May 29, 2012

(54) METHOD OF ESTIMATING SALT CONTAMINATION

(75) Inventors: Joon-Eel Kim, Yuseong-gu (KR); Nam-Woo Lee, Yuseong-gu (KR); Dong-Myung Kim, Yuseong-gu (KR)

(73) Assignee: Korea Electric Power Corporation, Seoul (KR)

(*) Notice: Subject to any disclaimer, the term of this patent is extended or adjusted under 35 U.S.C. 154(b) by 798 days.

(21) Appl. No.: 12/240,477

(22) Filed: Sep. 29, 2008

(65) Prior Publication Data

US 2009/0094181 A1 Apr. 9, 2009

(30) Foreign Application Priority Data

Sep. 28, 2007 (KR) .................. 10-2007-0097727

(51) Int. Cl.
*G06F 15/00* (2006.01)
*G06F 15/18* (2006.01)
(52) U.S. Cl. .................. 706/62; 706/45; 706/46; 706/52
(58) Field of Classification Search .................. None
See application file for complete search history.

(56) References Cited

FOREIGN PATENT DOCUMENTS

KR 10-2006-0077354 12/2004

OTHER PUBLICATIONS

Salam et al. "Prediction of equivalent salt deposit density of contaminated glass plates using artificial neural networks", Journal of Electrostatics, 2008, pp. 526-530.*
Gouda et al. "Influence of pollution on H.V. insulators", IEEE symposium on electrical insulation, 1990, pp. 195-198.*
Choi et al. "Degradation characteristics of the outdoor insulation material by salt fog", International symposium on electrical insulating materials, 1998, pp. 359-362.*
An et al. "Measurements of equivalent salt deposit density (ESDD) on a suspension insulator", IEEE transactions on dielectrics and electrical insulation, 2002, pp. 562-568.*
Pakpahan et al. "Multivariate statistical analysis for performance assessment of high voltage outdoor insulators operating under various meteorological conditions", IEEE, 2006, pp. 530-533.*
Takasu et al. Natural contamination test of insulators with DC voltage energization at inland areas, IEEE transactions on power delivery, 1998, pp. 1847-1853.*
Vosloo et al. "KIPTS natural ageing and pollution performance test procedure for outdoor insulator products", ESKOM Distribution Procedure, 2002, 24 pages.*
Wang et al. "Design implementation of insulators material hydrophobicity measure system by support vector machine decision tree learning", Fourth international conference on machine learning and cybernetics, 2005, pp. 4328-4334.*
Ahmad et al. "Prediction of salt contamination on high voltage insulators in rainy season using regression technique", IEEE, 2000, pp. 184-189.*
English translation of Jae-Hoon Kim et al., "Development of an Expert Technique and Program to Predict the Pollution of Outdoor Insulators," KIEE Issue, vol. 56, No. 1, pp. 28-34, Jan. 2007.

* cited by examiner

*Primary Examiner* — Omar Fernandez Rivas
(74) *Attorney, Agent, or Firm* — McDermott Will & Emery LLP

(57) ABSTRACT

A method of estimating a salt contamination is provided. The method includes preparing salt contamination data measured at a plurality of areas, preparing geographical factor data of areas for estimating, preparing rainfall amount data near the areas, setting a correlation expression having the geographical factor and the rainfall amount as variables, and estimating salt contamination of the areas for estimating according to the rainfall amount.

16 Claims, 19 Drawing Sheets

METHOD OF ESTIMATING SALT CONTAMINATION

PRIORITY

This application claims priority under 35 U.S.C. §119 to Korean Patent Application No. 2007-97727, filed on Sep. 28, 2007 in the Korean Intellectual Property Office (KIPO), the contents of which are herein incorporated by reference in their entirety.

BACKGROUND OF THE INVENTION

1. Field of the Invention

The present invention relates to a method of estimating contamination of an electric power device. More particularly, the present invention relates to a method of estimating salt contamination of an electric power device.

2. Description of the Related Art

In Korea, which is peninsula surrounded by sea, the typhoon moves from sea to land. When the typhoon moves from the sea to the land, the moisture in the atmosphere including salt is attached to the surface of the electric power distribution equipment so that the cease of the large districted power supply may be possibly caused. Thus, assessment of a contamination grade of the distribution equipment contaminated by salt is needed to apply in the operation of the distribution equipment.

In the conventional method, the salt contamination at the area around the coast is measured, thereby grasping the situation. Nobody estimates the salt contamination and applies the estimation for designing the distribution equipment.

SUMMARY OF THE INVENTION

The present invention provides a method of estimating a salt contamination reflected by a rainfall amount and a geographical factor.

In one aspect of the present invention, a method of estimating a salt contamination includes preparing salt contamination data measured at a plurality of areas; preparing geographical factor data of areas for estimating; preparing rainfall amount data near the areas; setting a correlation expression having the geographical factor and the rainfall amount as variables; and estimating salt contamination of the areas for estimating according to the rainfall amount.

In an exemplary embodiment, the salt contamination data may include an equivalent salt deposit density (ESDD), which is measured monthly at electric poles of a plurality of costal areas disposed from a coast to an inland.

In an exemplary embodiment, the step of preparing the geographical factor data includes setting a plurality of measuring points by dividing sections from a salt contamination measuring position to a coastal direction; measuring an altitude and a inclined angle at each measuring position; understanding a present condition of a land use near the measuring position; and setting the altitudes the inclined angle and the present condition of the land use as a geographical factor.

In an exemplary embodiment, the step of preparing rainfall amount data near the areas may include selecting a plurality of observatories near the areas; measuring a rainfall of each observatory; and calculating a rainfall of the areas by using interpolation with the measured rainfall of each observatory.

In an exemplary embodiment, the correlation expression having the geographical factor and the rainfall amount as variables may be set by using a decision making tree. A real salt contamination may be applied to the set decision making tree, thereby eliminating a branch having great error.

According to the present invention, the distribution of the salt contamination guessing the salt contamination of the costal area may be estimated.

Therefore, when the designer design a power distribution equipment, over-design of equipment is prevented and an adapt power distribution equipment for distribution wiring driving condition may be constructed with fully understanding the salt contamination degree and applying to the design of the power distribution equipment.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE PREFERRED EMBODIMENTS

Figure 1:
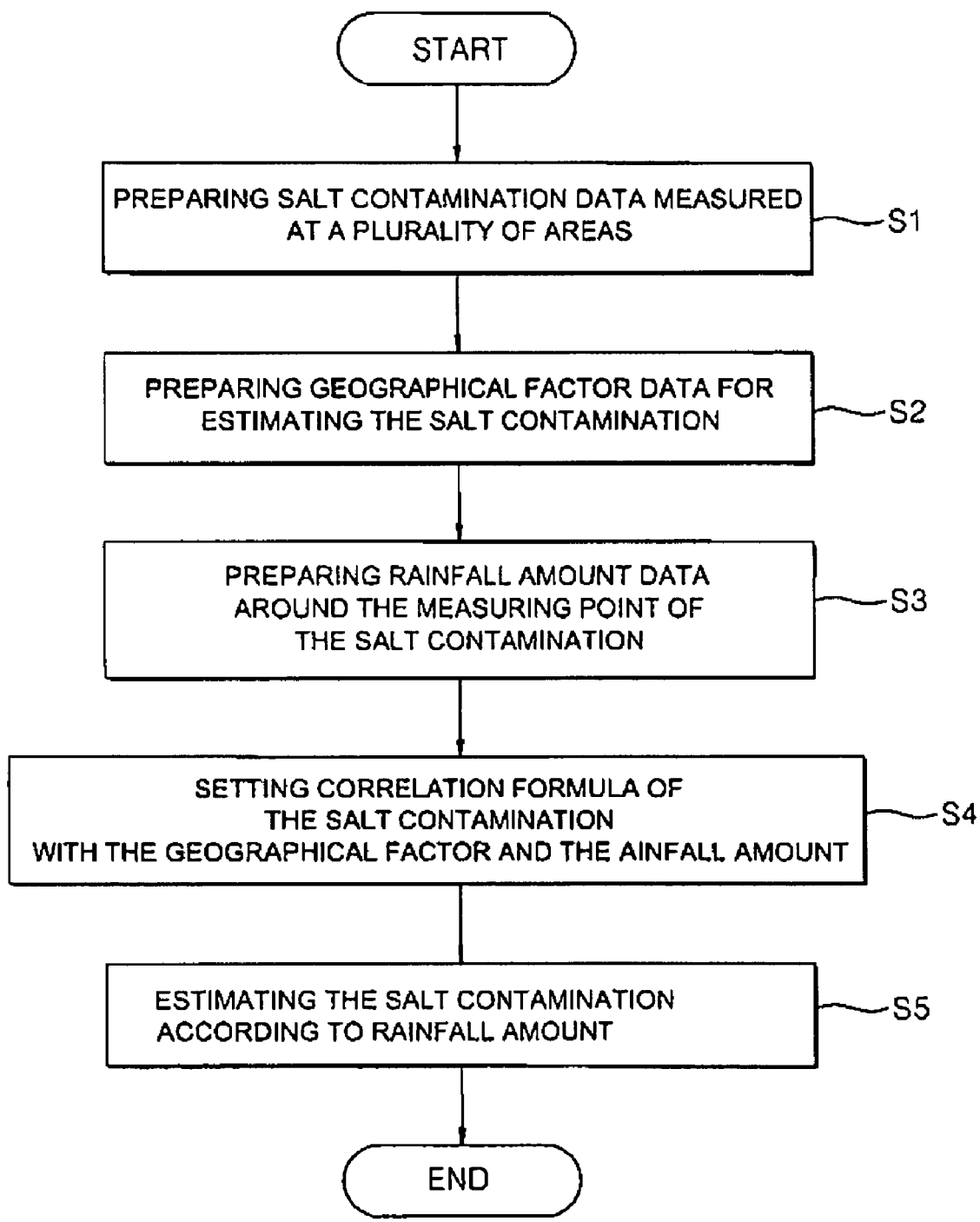
FIG. 1 is a flow chart illustrating a method of estimating salt contamination in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

FIG. 1 is a flow chart illustrating a method of estimating salt contamination in accordance with an embodiment of the present invention.

Referring to FIG. 1, salt contamination data measured at a plurality of regions is prepared. (S1 step)

Figure 2:
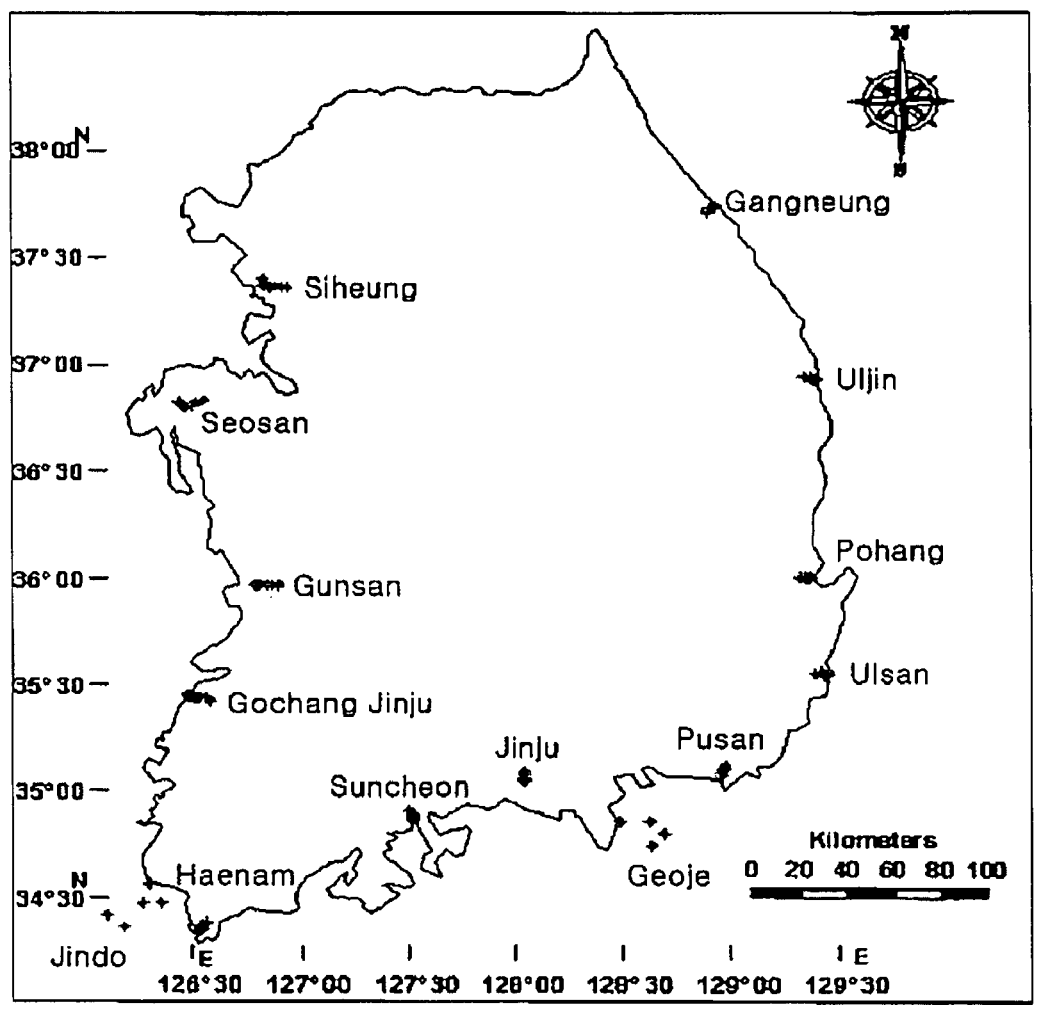
FIG. 2 is a map showing measuring positions of costal contamination in accordance with a present invention.

FIG. 2 is a map showing measuring positions of costal contamination in accordance with a present invention.

Referring to FIG. 2, an equivalent salt deposit density (ESDD), which is measured contamination data at whole provinces from coast to land at fourteen coastal areas from January 2005 to December 2006, may be usable.

Geographical factor data is prepared for estimating the salt contamination. (S2 step)

Figure 3:
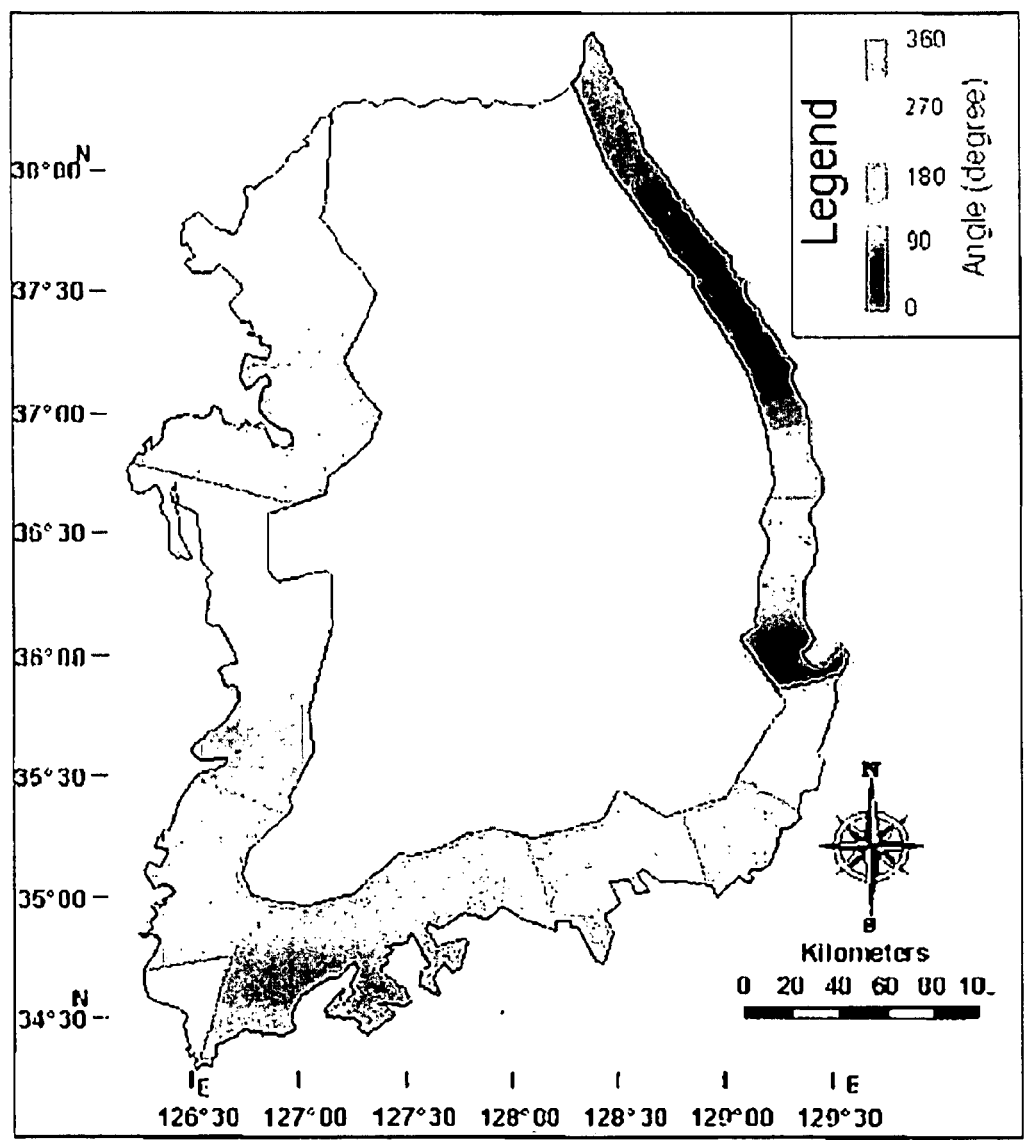
FIG. 3 is a map showing a vector direction toward the coast from a regional center divided by a geographical grid.

FIG. 3 is a map showing a vector direction toward the coast from a regional center divided by a geographical grid.

Referring to FIG. 3, definition of standard direction, which defines a costal direction from a contamination measuring position, may be problem at a coast area having severe curved coast. Thus, a drawing having simple coastal direction is manufactured, and the drawing may be used for extracting a geographical change with respect to the direction defined at the drawing.

Figure 4:
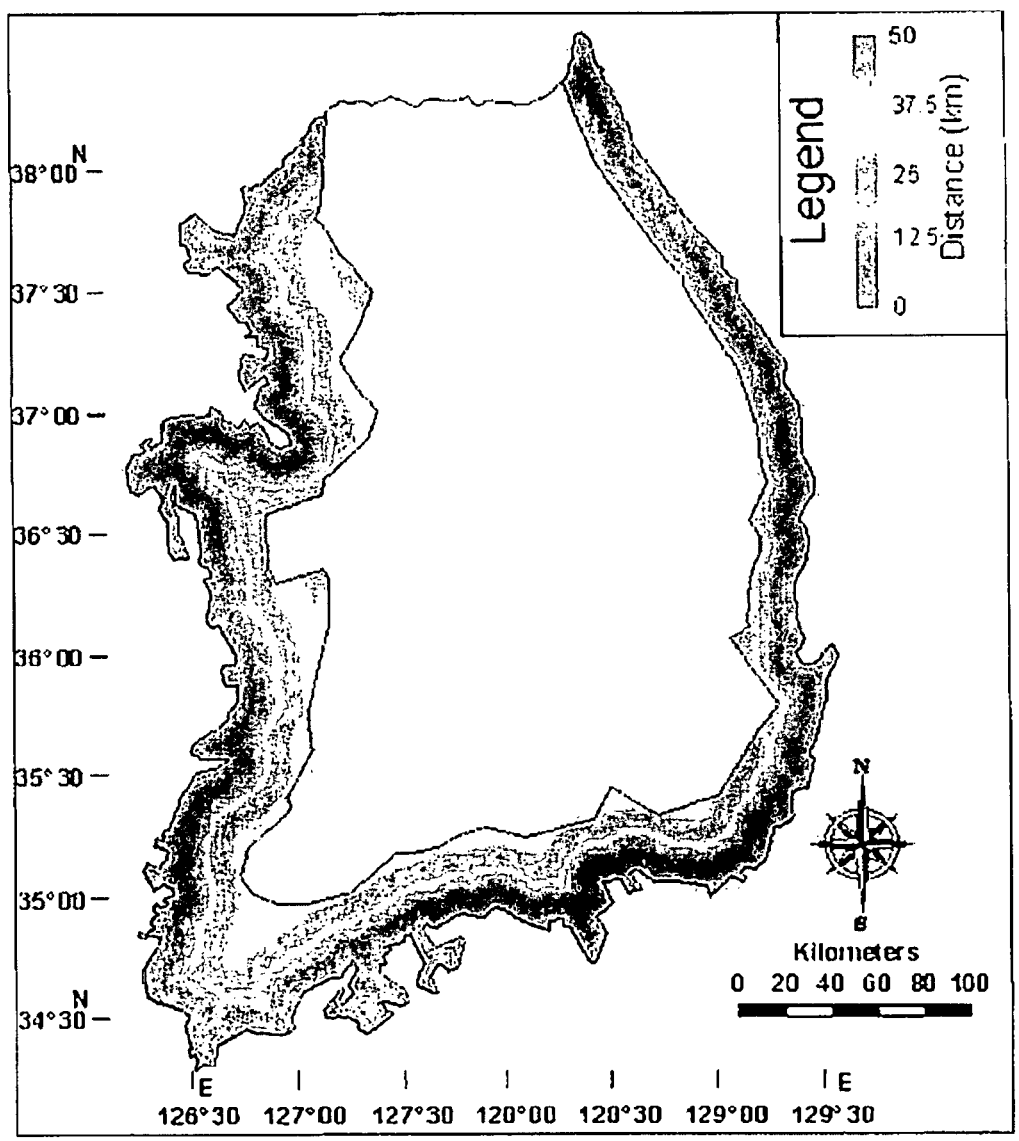
FIG. 4 is a map showing distances between a coast and a geographical grid.

FIG. 4 is a map showing distances between a coast and a geographical grid.

Referring to FIG. 4, in order to analyze a distance from a coast line, the distance from the coast line may be calculated by using a normal vector to the coast line in the simplified drawing.

Algorithm of the calculation may be processed by manufacturing a software using components of a map object.

Figure 5:
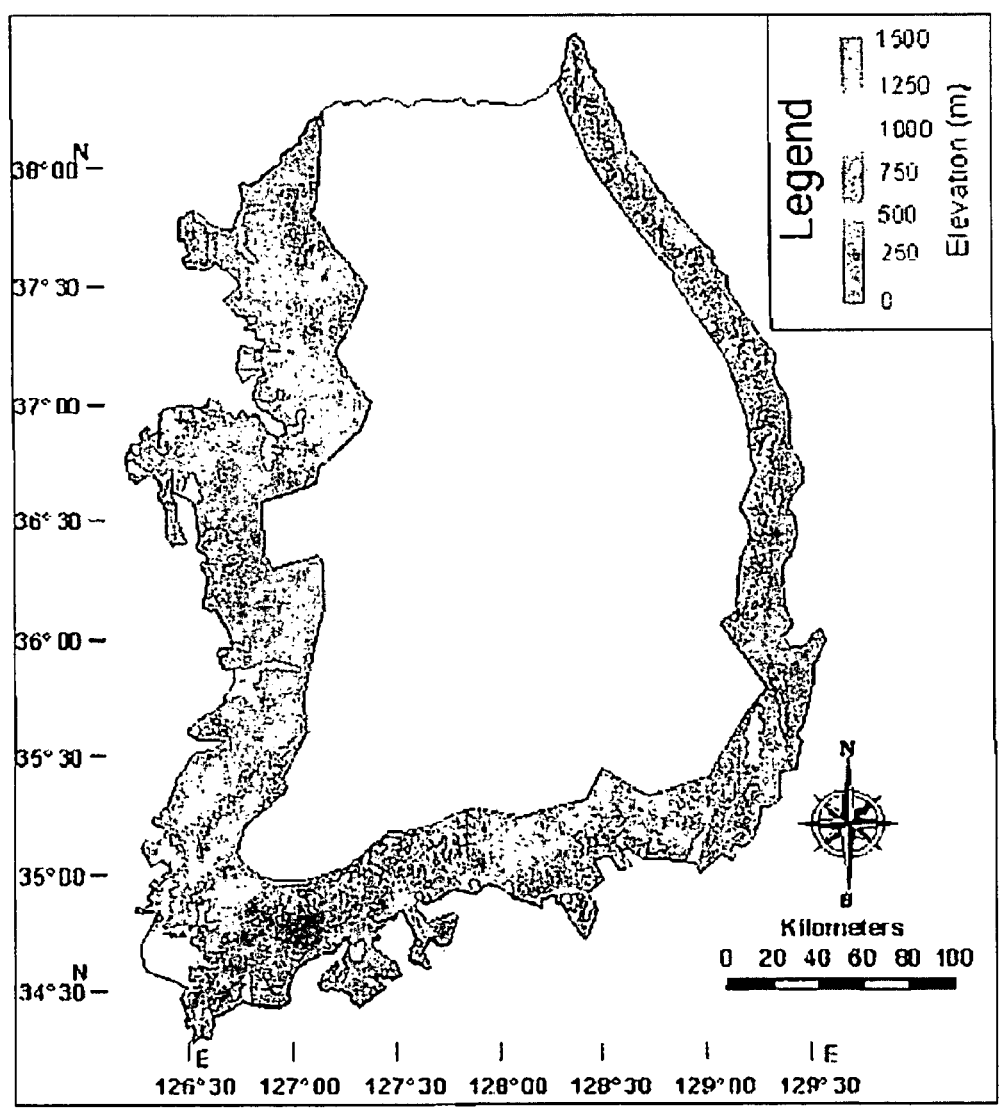
FIG. 5 is a map showing evaluations corresponding to geographical grids.

FIG. 5 is a map showing evaluations corresponding to geographical grids.

Referring to FIG. 5, an area from the coast at a predetermined distance is divided into grids having 1 kilometer-square, and altitude corresponding to each grids may be measurable.

For example, a distance from the coast to the measuring point is divided into 20 points by 500 meters intervals, and altitude and inclined angle of each point may be recorded. Thus, geographical data from the coast to the ten kilometer area may be obtained.

The geographical data may be obtained from digital elevation model (DEM), which is manufactured by reading altitude at one second at 1 to 50000 scale geographic map divided into 234 areas.

Figure 6A:
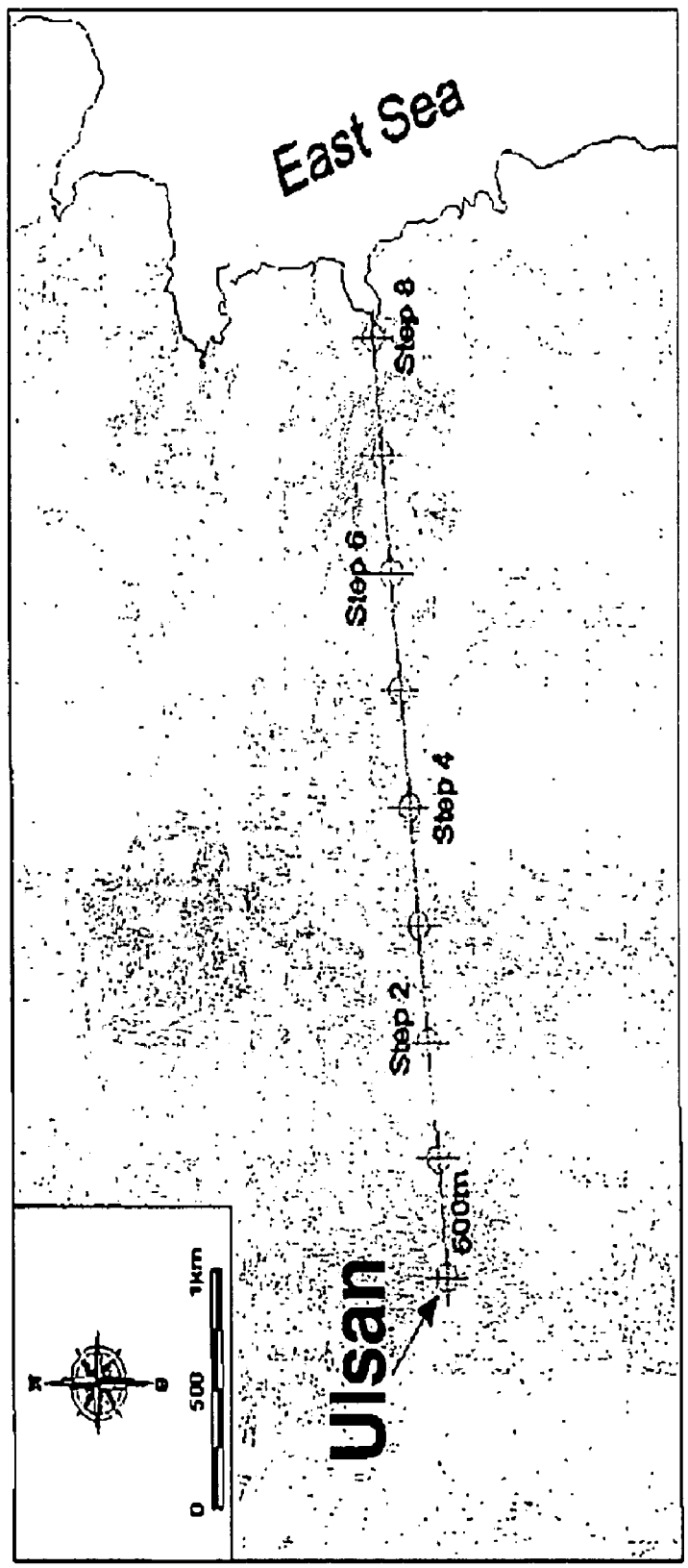
FIG. 6A is a partial map showing a method of extracting a geographical factor.
Figures 6B, 6C:
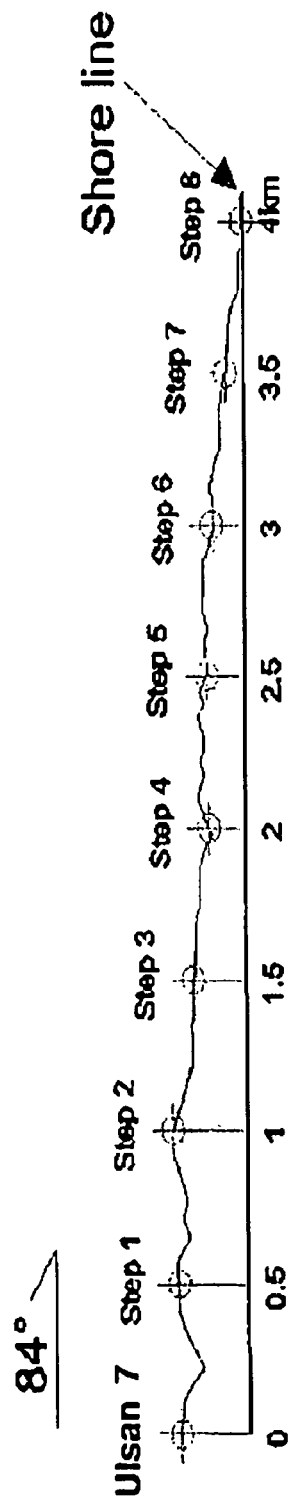
FIG. 6B is a graph explaining a method of extracting a geographical factor.
FIG. 6C is a table explaining a method of extracting a geographical factor.

FIG. 6A is a partial map showing a method of extracting a geographical factor. FIG. 6B is a graph explaining a method of extracting a geographical factor. FIG. 6C is a table explaining a method of extracting a geographical factor.

Referring to FIG. 6A, a geographical factor of an altitude data 1H, 2H and an inclined angle data 1D, 2D may be extracted by reading altitude change and inclined angle data at a predetermined section of the geographical data at the measuring point of the salt contamination. The predetermined section of the geographical data may be defined as moving points by every 500 meters with a vector heading the coast line, for example. The inclined angle of the geographic may be calculated by method least squares with three altitude data, which are an altitude data at the measuring point, a previous altitude data moving backward in the vector direction by 100 meters and a following altitude data moving forward in the vector direction by 100 meters, and by reading the inclined angle by clockwise direction with respect to a horizontal direction. Thus, an angle of a counter-clockwise direction is recorded as a negative value.

Figure 7:
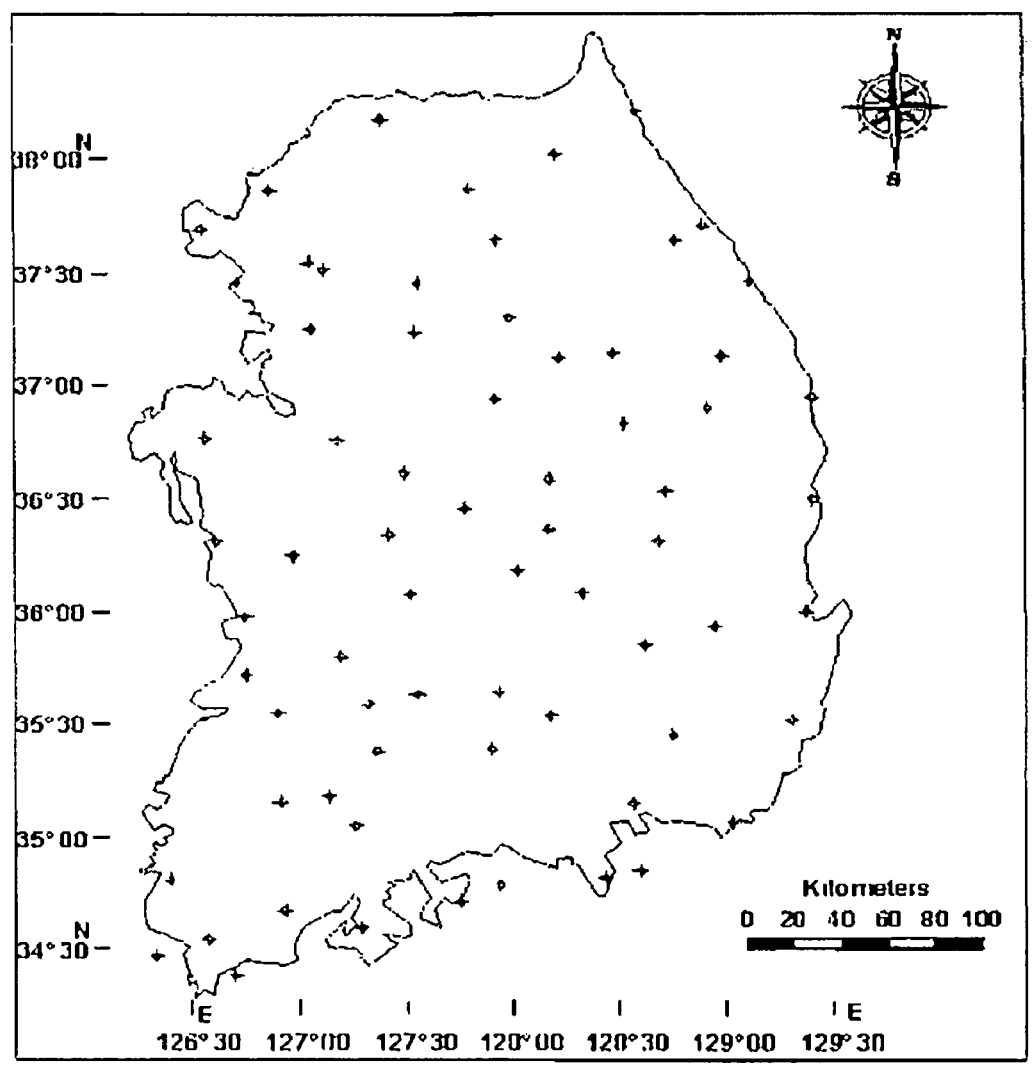
FIG. 7 is a map showing 76 observatories for collecting rainfall data.

FIG. 7 is a map showing 76 observatories for collecting rainfall data.

Referring to FIG. 7, a present situation for land uses is understood by using a geographical cover classifying map. For example, the geographical cover classifying map provided by the environmental information service of the Environment Department is provided as a map divided into 234 areas at the scale of 1 to 50,000.

Figure 8:
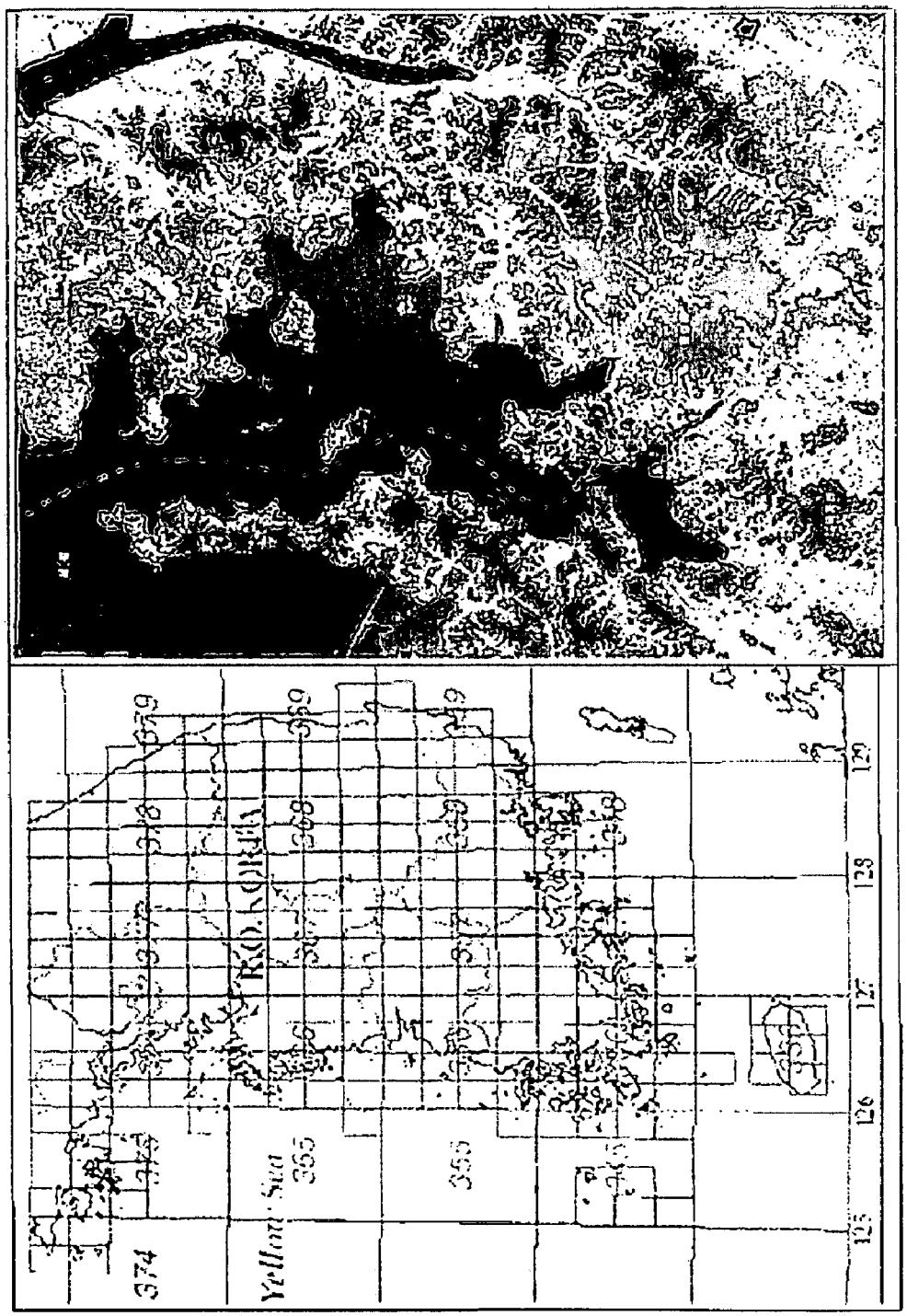
FIG. 8 is a map showing a geographical cover classifying of environmental information service.

FIG. 8 is a map showing a geographical cover classifying of environmental information service.

Referring to FIG. 8, the present invention may make a new geographical cover classifying map at the scale of 1 to 50,000 distributing areas with a predetermined distance from the costal lines. For example, the predetermined distance may be 20 kilometers.

The present situation of the land uses at the measuring point of the salt contamination may exclude the changes at the boundary area and the peripheral area of the map by extracting the present situation of the land uses at 9 pixels around the measuring point and by selecting maximum land use grade (water, forest, grassland, town, farmland, vacant) from the corresponding present situation of the land uses.

Rainfall amount data around the measuring point of the salt contamination is prepared. (S step)

Figure 9:
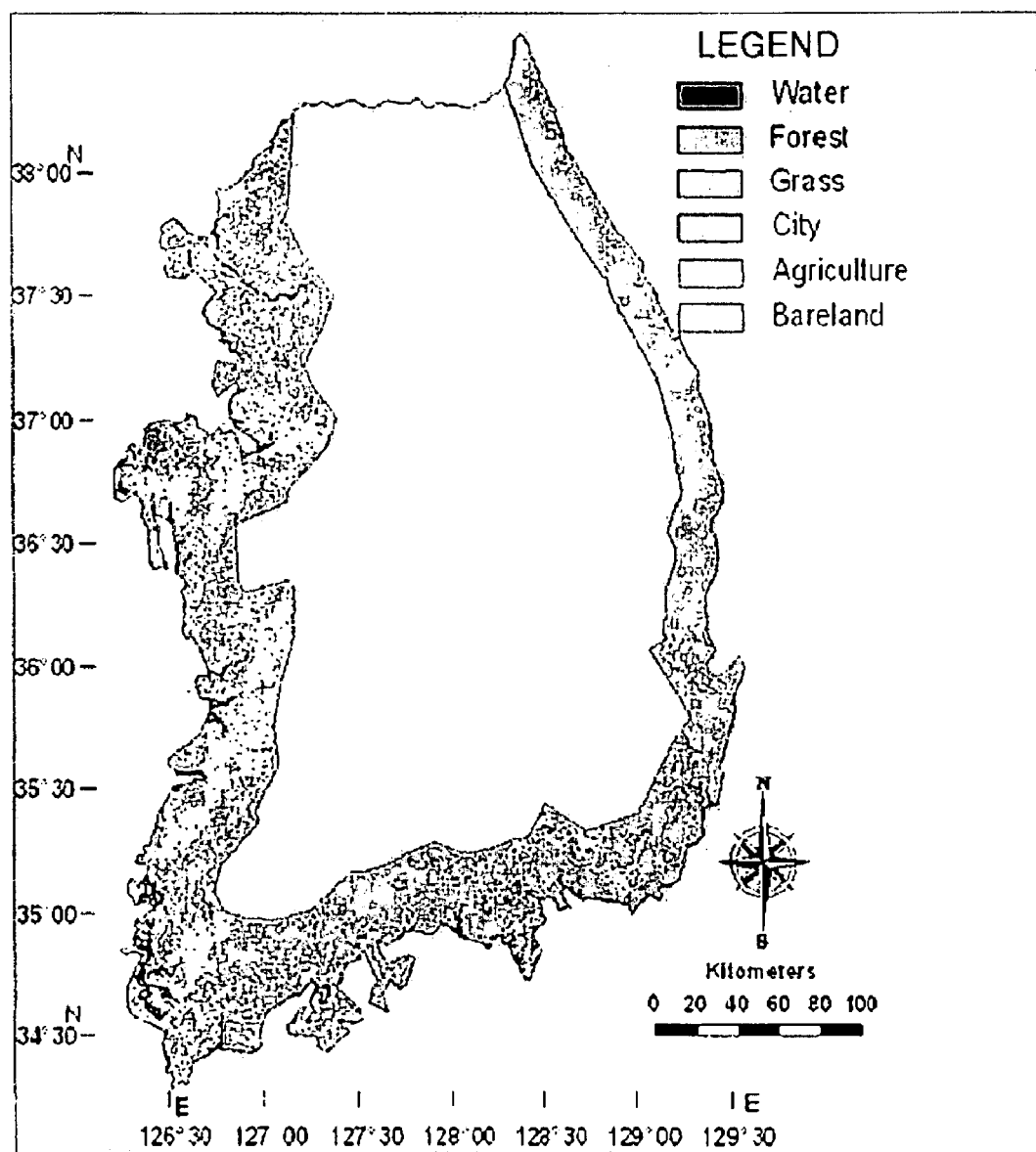
FIG. 9 is a map showing a land utility within a coastal approaching area.
Figure 10A:
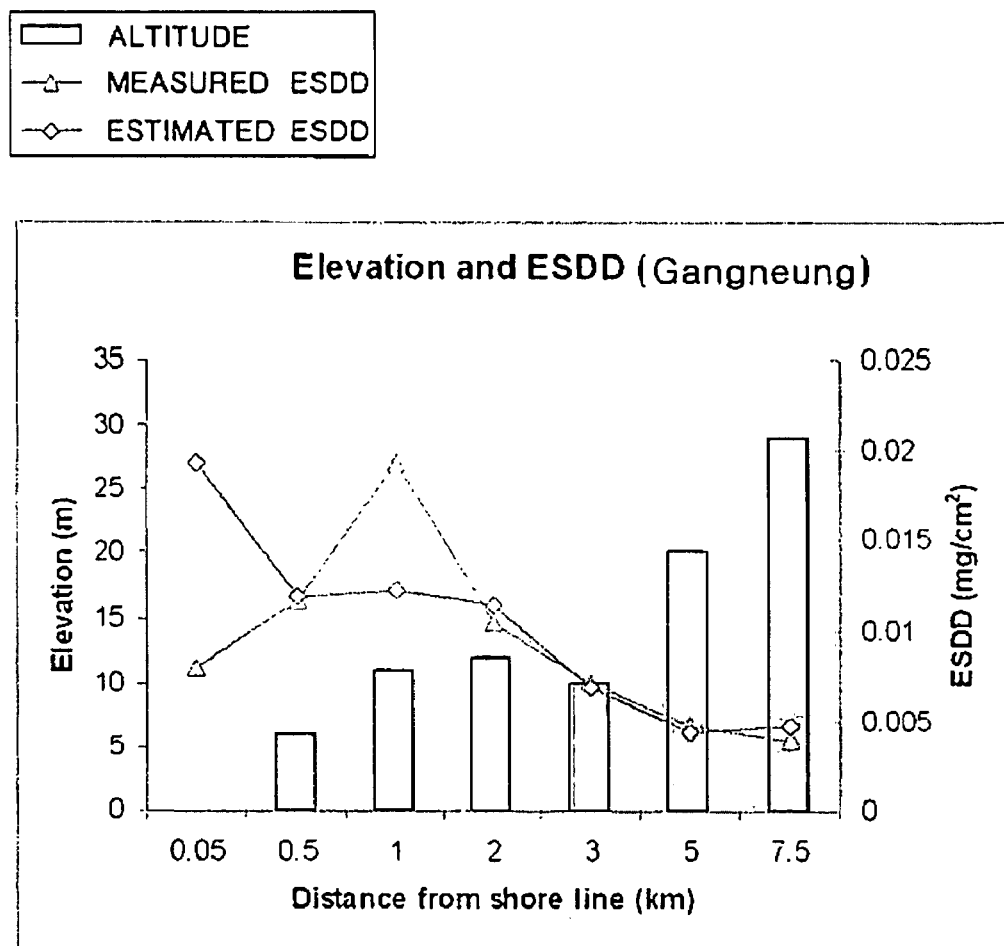
FIGS. 10A to 10F are graphs showing comparison of measured contamination data with estimated data.
Figure 10B:
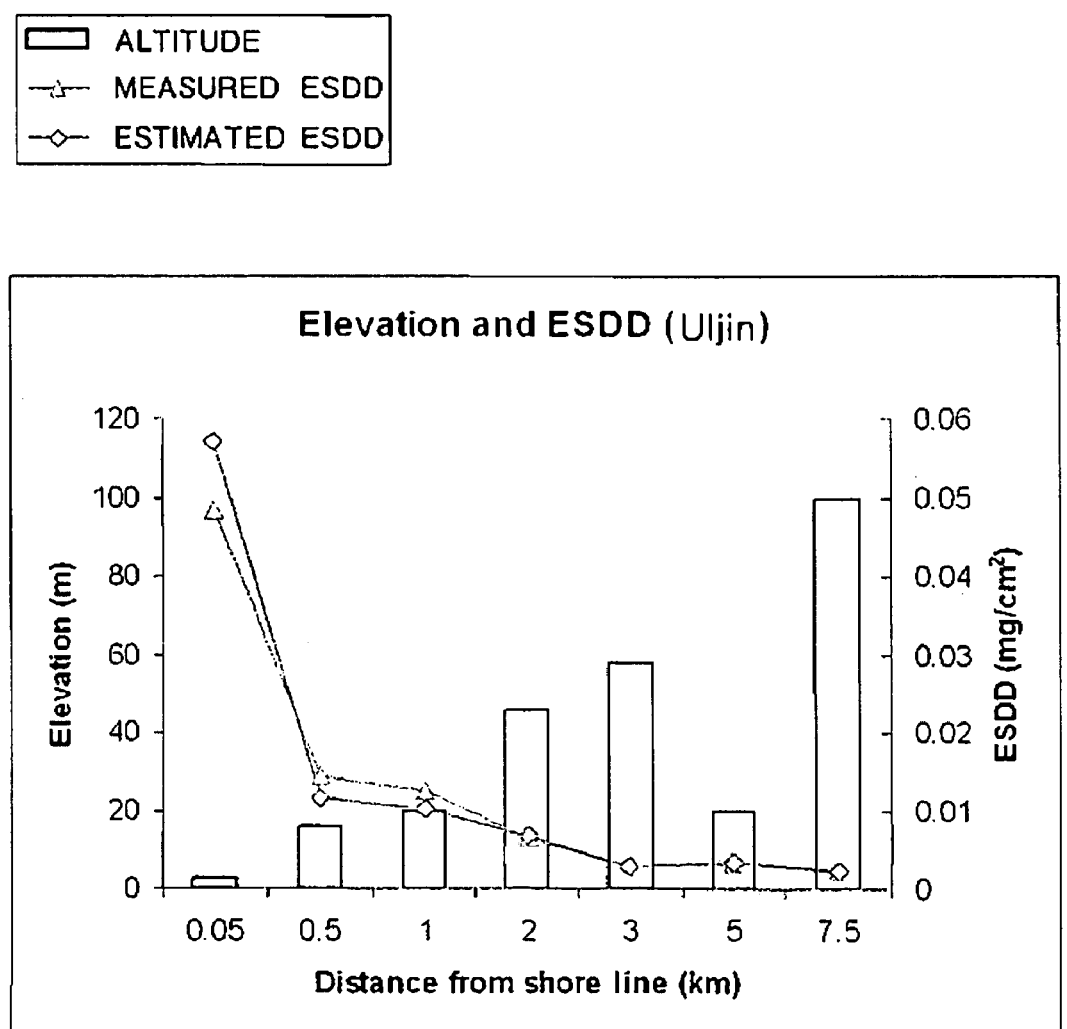
Figure 10C:
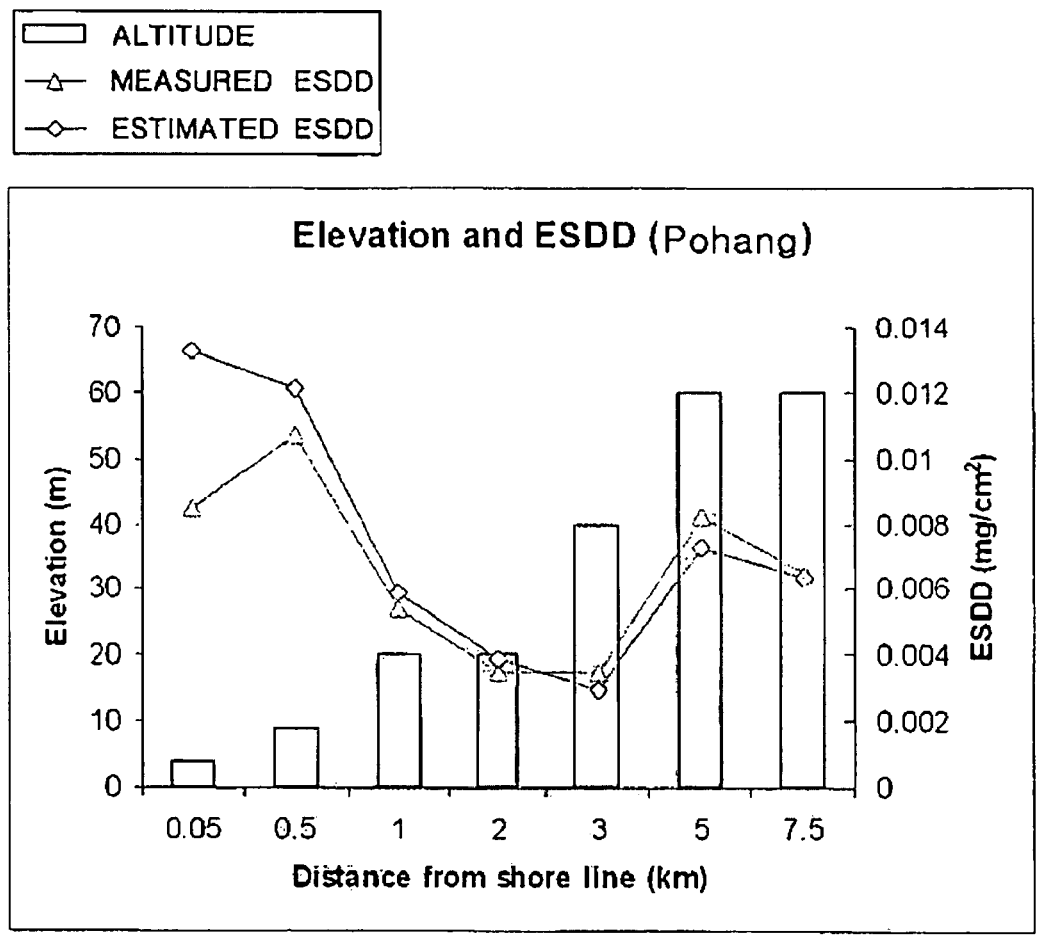
Figure 10D:
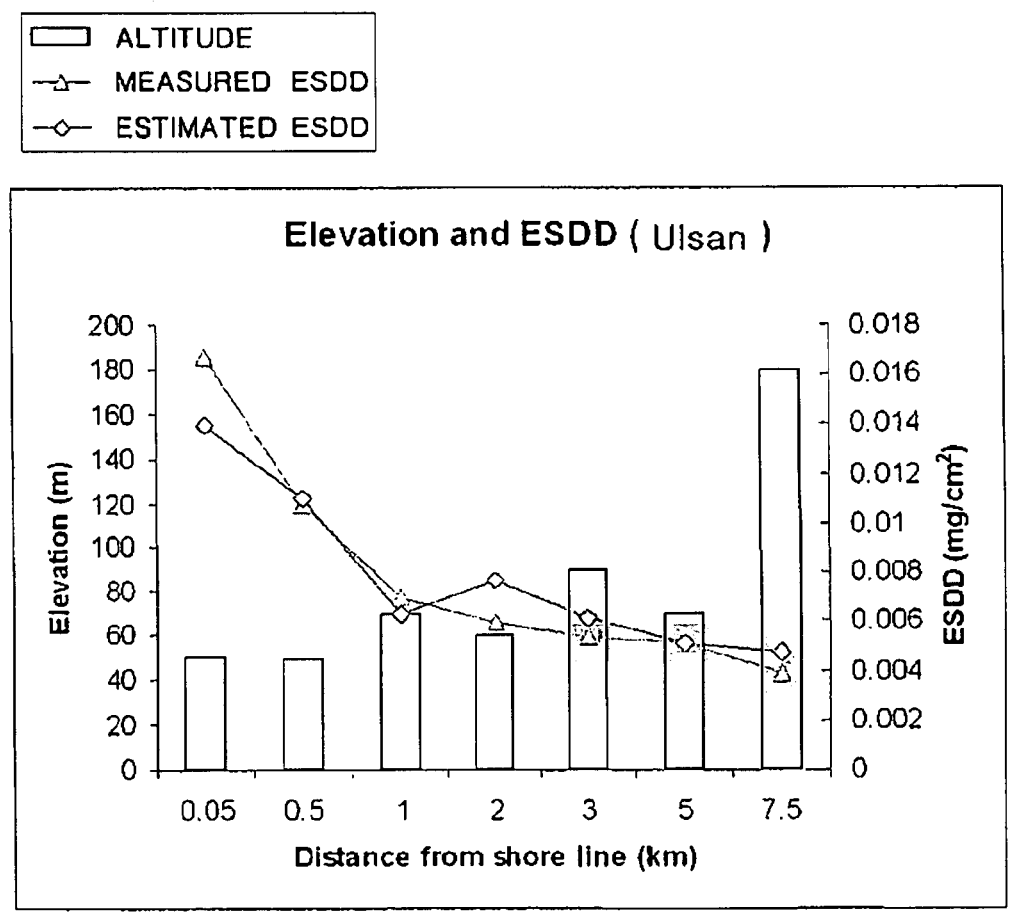
Figure 10E:
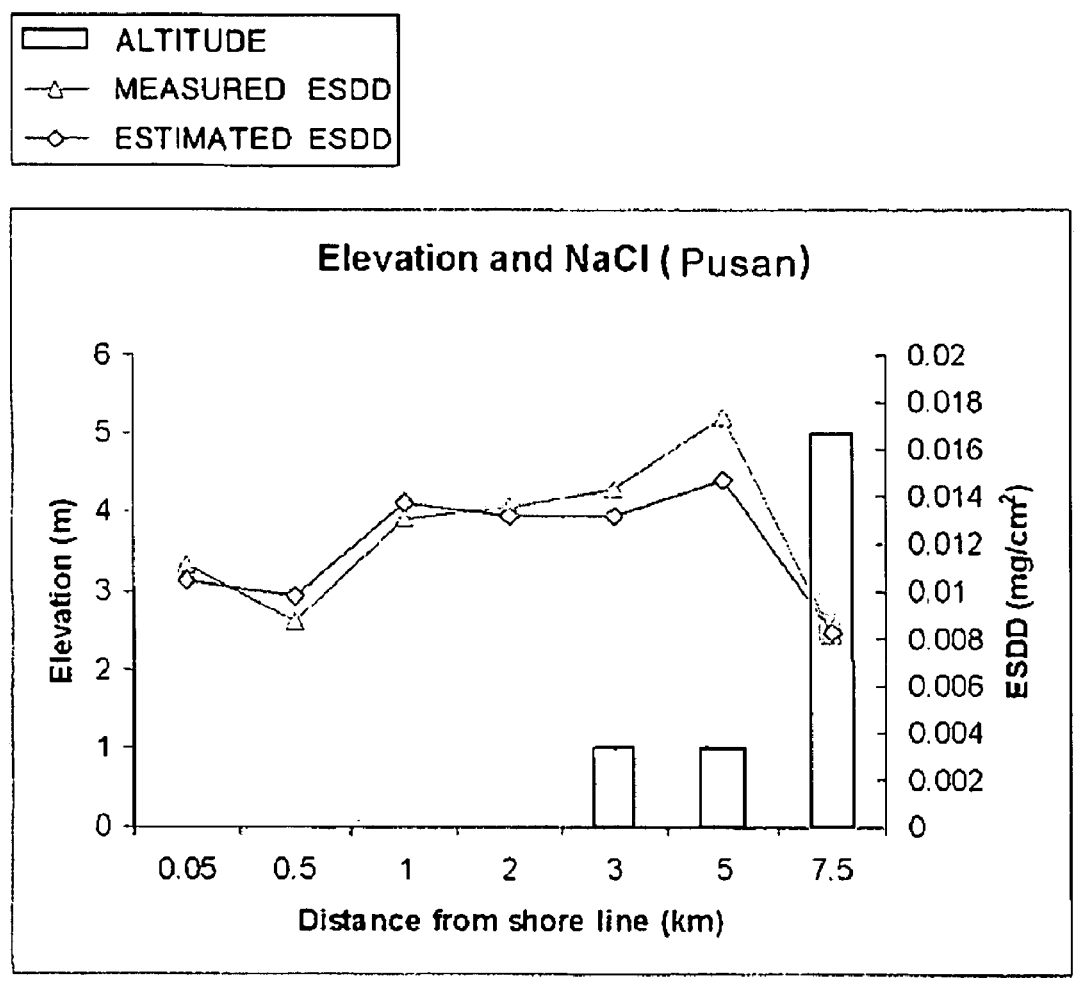
Figure 10F:
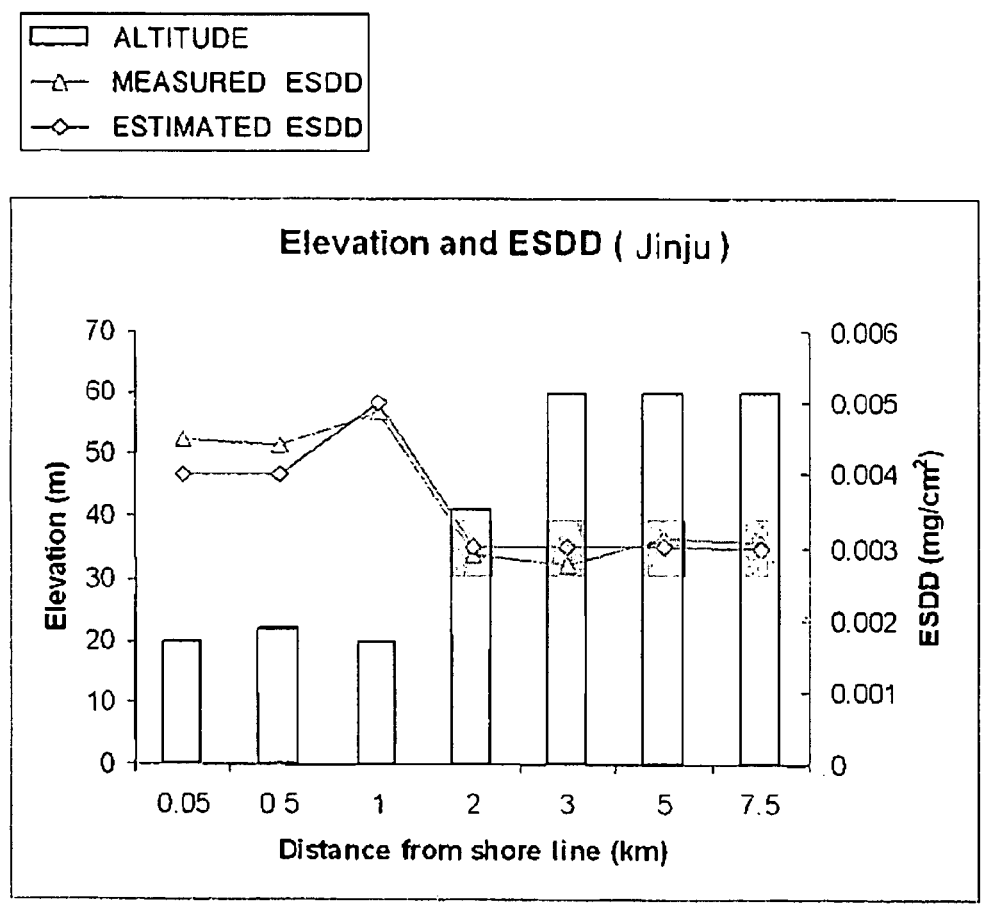

FIG. 9 is a map showing a land utility within a coastal approaching area

Referring to FIG. 9, the rainfall amount is obtained by enhancing the rainfall data from the 76 observatory of a whole country provided by the Korea Meteorological Administration. The spots in FIG. 8 are positions of the 76 observatories of the whole country, and a rainfall amount data by dates observed at each observatory may be arranged to the database.

The rainfall at the position in which the salt contamination is measured may uses the rainfall amount accumulated from a day one month before the measuring date of measuring the salt contamination.

The accumulated rainfall amount accumulated from the one month before the salt contamination measuring date at each observatory is calculated by detecting a plurality of observatories close to the positions in which the salt contamination is measured.

The accumulated rainfall amount at each observatory is calculated by using the interpolation method after calculating the distance from a plurality of observatories to the measuring point of the salt contamination. The interpolation method may be applied by inverse distance weight (IDW) method.

A correlation formula of the salt contamination is set with defining the geographical factor and the rainfall amount measured and calculated at the above. (S4 step) The correlation formula may be set by using a decision making tree.

The decision making tree is one of the data mining techniques, and the data mining is very usable method to extract data structure such as patterns, statistical models, relationships existing in a large database. The data mining defines rules existing in a plurality of data such as pattern and regularity of variables as computer logics and the defined rules are applied to the other database, so that a conclusion guided by the rules from the database is assumed by the decision making tree. The data mining has been successful at medical science, distribution industry and so on, and the application of the data mining is expanded rapidly, but the application to the engineering is merely advanced. The data mining is a method processing data group including numbers and characters data statistically, and is very useful when the number data of the geographical data and the character data of the land use grade are mixed. The decision making tree processes the data classification hierarchically, and the characteristics of the data are classified by one more tree structure at each classifying step. When the data have various characteristics, the characteristic having the greatest influence on classifying is selected and is classified as a branch, and the most adaptable characteristic is selected at each branch, and the classifying is proceeded. A node is defined as a position generating a branch, and a first node is defined as a root node. A purpose of classifying using the decision making tree is to classify input data to corresponding category according to the characteristic. Thus, when the input data is prepared, the category of the data is founded by classifying a value of the characteristic hierarchically. The final classified category is defined as leaf, which means a leaf of the tree. In the decision making tree, the data classified as branch at each step is classified as a branch of the next step, but sometimes may be a leaf itself. The decision making tree keep classifying from a top to bottom till the input data becomes a leaf, which is a final classifying step. As various method manufacturing the decision making tree are developed, ID3 (Quinlan, 1986), classification and regression tree (CART) (Beriman, 1984), Chi-Square Automated Interaction Detection (CHAIOD) (Kass, 1980), C4.5 or See 5/C5.0 (Quinlan, 1993) and so on are introduced. The CART method is most adaptable for a data structure having mostly number data for geographical data and a character data for the land use grade such as the salt contamination.

The present invention may use M5P algorithm provided as Weka software for making the decision making tree.

The M5P algorithm is made as multivariate linear for leaves of the decision making tree. When the decision making tree is manufactured, the most important step is to decide a branch at a node. In other words, the most important step is what characteristic is chosen and by which classifying standard the characteristic is classified. Which characteristic is defined as a node firstly to start the classification is important. The M5P algorithm used in the present invention uses a standard deviation reduction (SDR) theory as shown in Equation (1) for selecting the characteristic defined as the node $$SDR = sd(T) - \sum \frac{|Ti|}{|T|} \times sd(Ti) \qquad (1)$$

In Equation (1), sd(T) is a standard deviation of the equivalent sale deposit density (ESDD) of the whole data, and sd(Ti) is a data group classifying the area of the selected characteristic into i groups.

For example, when the data group includes data having 30 meters to 800 meters of the distance characteristics, the data group is divided into three data groups, which are 30 to 200 meters group, 201 to 400 meters group and 401 to 800 meters group, and |Ti| is an average of the ESDD data of the each three groups. After calculating SDR value of each characteristic, the characteristic having minimum SDR value is decided as a node.

When the first node is decided, the above mentioned calculation is preceded about the data group classified in the next step to decide a next node. The whole decision making tree is made by repeating to decide a next node. Comparing the standard deviation of the whole data with the standard deviation of the classified data, when the standard deviation of the classified data is less than five percent of the standard deviation of the whole data or the number of the data is equal or less than four, the classification is defined as a leaf and the classification is terminated.

When a shape of the branch is decided, the following polynomial is made as shown in Equation (2) with allocated data to the final leaf of the decision making tree.

$$w_0 + w_1 a_1 + w_2 a_2 + w_3 a_3 + \ldots + w_k a_k \quad (2)$$

In Equation (2), the calculated value at the above polynomial is ESDD, and $a_k$ is a characteristic variable, and $w_k$ is a weight of each characteristic.

Even if an importance of each characteristic is calculated by SDR, the characteristic data may be divided into proper groups before calculating. In the dividing process, a boundary of the divide is pointed as shown in Equation (3).

$$\Phi(s/r) = 2 P_L P_R \sum_{j=1}^{m} P(C_j | t_L) - P(C_l | t_R) \quad (3)$$

In Equation (3), $P_L$ and $P_R$ are probabilities for existence of the divided data at the left and the right with respect to the division boundary, respective. $P(C_j/t_L)$ and $P(C_j/t_R)$ are probabilities of the divided characteristics at the left data group and the right data group, respectively. For example, the division of the characteristics may be a group of 30 to 200 meters, a group of 201 to 400 meters and a group of 401 to 800 meters.

The most characteristic data of the present invention is the number data, but the data of the geographical cover classifying map is the character data. In the character data, the divided groups in the characteristic are bind into two combination groups, and the branch is classified by calculating SDR using probabilities of the left and the right of the combination in the algorithm used in the present invention.

An initial decision making tree manufactured at the above process has overfitting characteristic having too much branch because of too much divided data. The characteristic is caused by the algorithm applying all data used in the study and trying to guide classify as accurately as possible.

FIGS. 10A to 10F are graphs showing comparison of measured contamination data with estimated data.

Referring to FIGS. 10A to 10F, the ESDD estimated at a plurality of areas is similar to or has difference from the real measured data, and sometimes has error as much as overfitting level. The overfitting problem is mostly occurred at the initial decision making tree when the characteristic data covers large areas. To compensate the overfitting problem, pruning the decision making tree by a proper algorithm may be proceeded.

Generally, in the process making the decision making tree, a dividing algorithm is manufactured to classify all components to designated class, so that a first made tree structure has many branches and overfitting is made surely.

A partial sample is selected from mass data and is used as the study data to manufacture the studied decision making tree, and the unselected data is inputted for verification. The first decision making tree by using the study data is manufactured to be capable of classifying the issued study data most properly, so that an error may occur when classifying the verification data. When wrong data is included to the study data, the decision making tree is made based on the wrong data, so that the decision is making tree is not adapt for the decision making tree classifying the whole data. Thus, in order to make a credible decision making tree, the overfitted tree structure may be pruned. Such pruning is proceeded by comparing the ESDD value calculated by the polynomial with the ESDD measured actually and by eliminating a part having a greater error and integrating a branch of the decision making tree.

The decision making tree advances to a lower structure by classifying according characteristic class at each node. The decision making tree may be transformed as a classification principle expressed by "if-Then". Such classification principle computerizes the decision making tree for application to a test set group.

For example, a decision making tree made by applying M5P algorithm of Weka is the following:

```
DisFromShore <= 1542 :
| Elevation <= 3.5 : LM1 (81)
| Elevation > 3.5 : LM2 (199)
DisFromShore > 1542 :
| Landuse=Grass,Agriculture,Mud,Water <= 0.5 :
| | 18H <= 15 :
| | | 4D <= 0.143 :
| | | | RAINFALLAMOUNT <= 117.708 :
| | | | | RAINFALLAMOUNT <= 31.447 :
| | | | | | RAINFALLAMOUNT <= 24.029 :
| | | | | | | 1D <= -0.716 : LM3 (25)
| | | | | | | 1D > -0.716 : LM4 (24)
| | | | | | RAINFALLAMOUNT > 24.029 : LM5 (13)
| | | | | RAINFALLAMOUNT > 31.447 :
| | | | | | 3D <= 0.43 : LM6 (56)
| | | | | | 3D > 0.43 : LM7 (25)
| | | | RAINFALLAMOUNT > 117.708 :
| | | | | 6H <= 1 : LM8 (43)
| | | | | 6H > 1 : LM9 (22)
| | | 4D > 0.143 : LM10 (110)
| | 18H > 15 :
| | | 18D <= 0.143 : LM11 (60)
| | | 18D > 0.143 : LM12 (53)
| Landuse=Grass,Agriculture,Mud,Water > 0.5 :
| | RAINFALLAMOUNT <= 117.276 :
| | | Elevation <= 3 :
| | | | RAINFALLAMOUNT <= 19.041 :
| | | | | RAINFALLAMOUNT <= 10.767 :
| | | | | | 6D <= -0.859 : LM13 (4)
| | | | | | 6D > -0.859 : LM14 (7)
| | | | | RAINFALLAMOUNT > 10.767 :
| | | | | | 7H <= -26 : LM15 (5)
| | | | | | 7H > -26 : LM16 (6)
| | | | RAINFALLAMOUNT > 19.041 : LM17 (87)
| | | Elevation > 3 : LM18 (415)
| | RAINFALLAMOUNT > 117.276 : LM19 (156)
LM num: 1
  ESDD =   0.0001 * DisFromShore - 0.0001 * RAINFALL
AMOUNT + 0.0262
LM num: 2
  ESDD =   0.0002 * Elevation - 0.0001 * 2H - 0.0003 * 1H + 0.0154
LM num: 3
  ESDD = 0.0075
LM num: 4
  ESDD = 0.0051
LM num: 5
  ESDD = 0.003 * 6D - 0.0025 * RAINFALLAMOUNT + 0.0918
LM num: 6
  ESDD = -0.0003 * 9D + 0.0071
LM num: 7
  ESDD = 0.009
LM num: 8
  ESDD = -0.0016 * Landuse=DenseForest,Grass,Agriculture,
Mud,Water + 0.0063
LM num: 9
  ESDD = 0.0034
LM num: 10
  ESDD = 0.0001 * 1H + 0.0041
LM num: 11
  ESDD = 0.0029
LM num: 12
  ESDD = 0.0044
LM num: 13
  ESDD = 0.022
```

-continued

```
LM num: 14
ESDD = 0.0078
LM num: 15
ESDD = 0.0188
LM num: 16
ESDD = 0.043
LM num: 17
ESDD =   0.0038 * Landuse=Agriculture,Mud,Water + 0.0093
LM num: 18
ESDD =  -0.0001 * Elevation + 0.0001 * 14H - 0.0002 * 5D -
0.0003 * 3D +0.0132
LM num: 19
ESDD = 0.0002 * 2D 0.0074
```

The decision making tree is manufactured by using a measured salt contamination, and accumulated rainfall amount between the measuring date and previous measuring date, which is substantially one-month ago, is used for inducing a relational expression. Thus, each different rainfall amounts corresponding to the measuring points are reflected.

The salt contamination is estimated according to rainfall amount by using the relational expression. (S5 step)

In order to manufacture a salt contamination distribution graph of the area adjacent to the coast line by using the decision making tree, a space distribution estimating of rainfall may be considered. The rainfall amount is data changed according to a time and a position, so that the rainfall amount adjacent to the coastal line of the whole country is needed to be estimated spatially.

The spatial distribution of the rainfall amount depends on how the rainfall amount data changing according to times is treated. Thus, to make the spatial distribution map simply is impossible. Therefore, in the present invention, under an assumption that salt is washed by rain and is relatively less deposited when it rain heavily, estimating a proper rainfall is applied, so that the salt contamination accumulation may be estimated.

Figure 11:
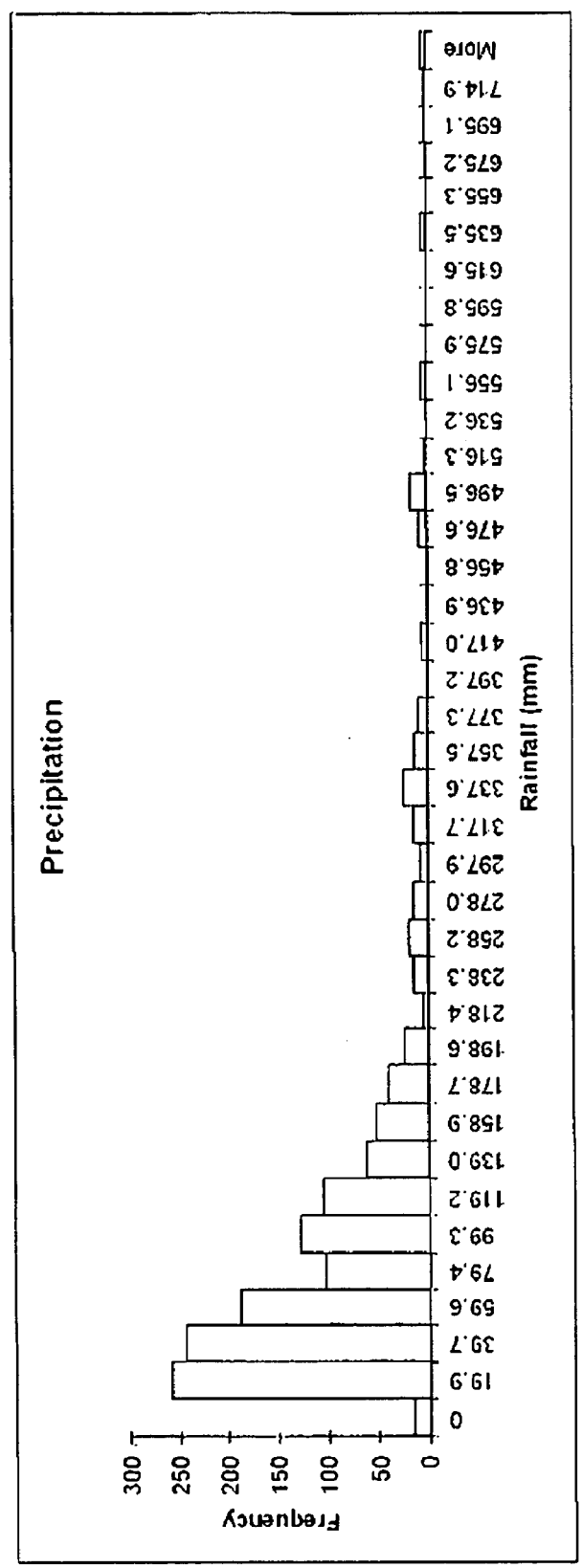
FIG. 11 is a histogram showing frequency of all accumulated rainfall used in manufacturing decision making tree.

FIG. 11 is a histogram showing frequency of all accumulated rainfall used in manufacturing decision making tree.

Figure 12:
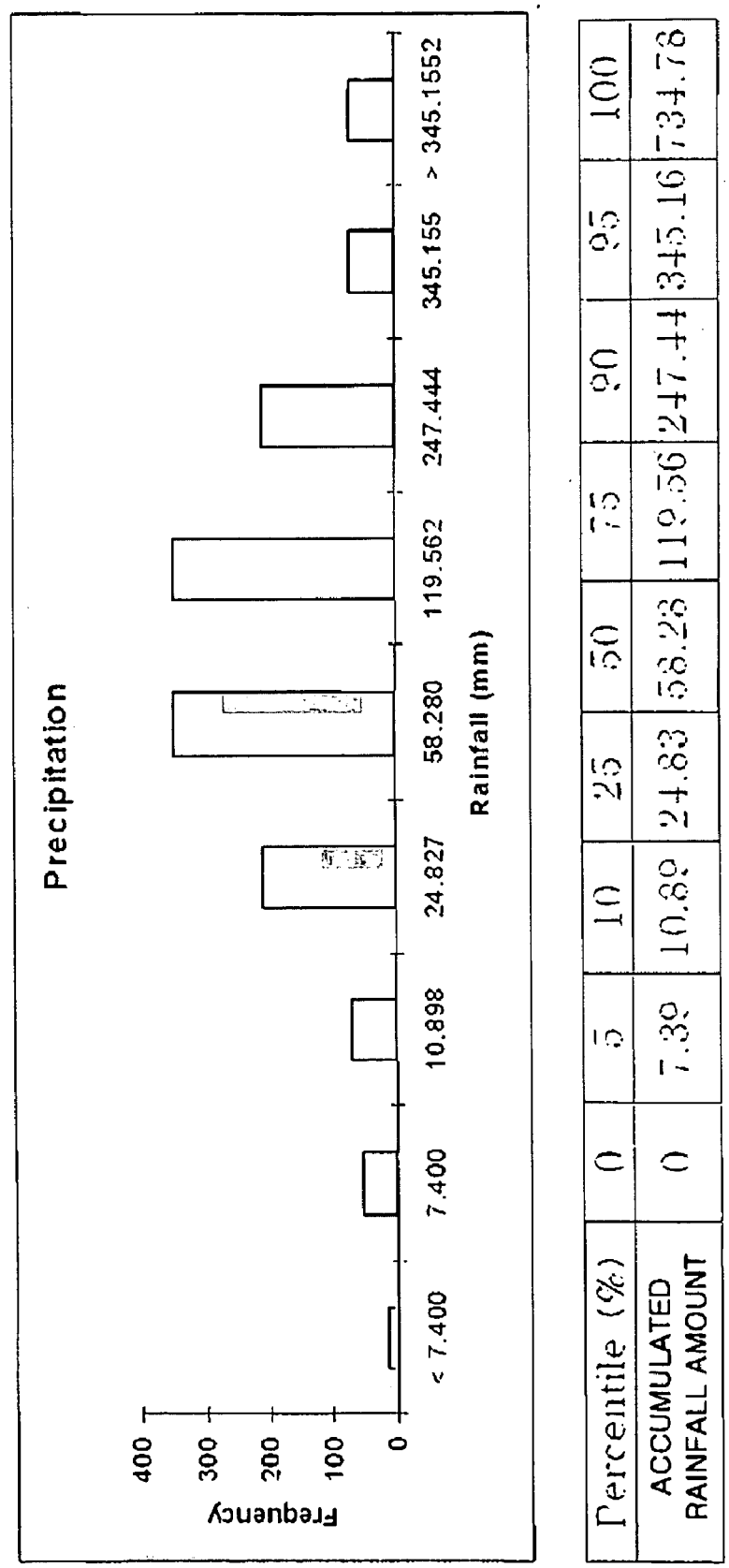
FIG. 12 is a graph showing distribution of all accumulated rainfall used in manufacturing decision making tree.

FIG. 12 is a graph showing distribution of all accumulated rainfall used in manufacturing decision making tree.

Referring to FIGS. 11 and 12, the accumulated rainfall's average is about 99.5 mm and a standard deviation of the accumulated rainfall is about 117.26 mm. Thus, a boundary of a first standard deviation including about 67 percents of the whole data starts 40.87 mm, which is 99.5-117.26/2. The present invention applies the accumulated rainfall amount of 40 mm to the whole area.

Figure 13:
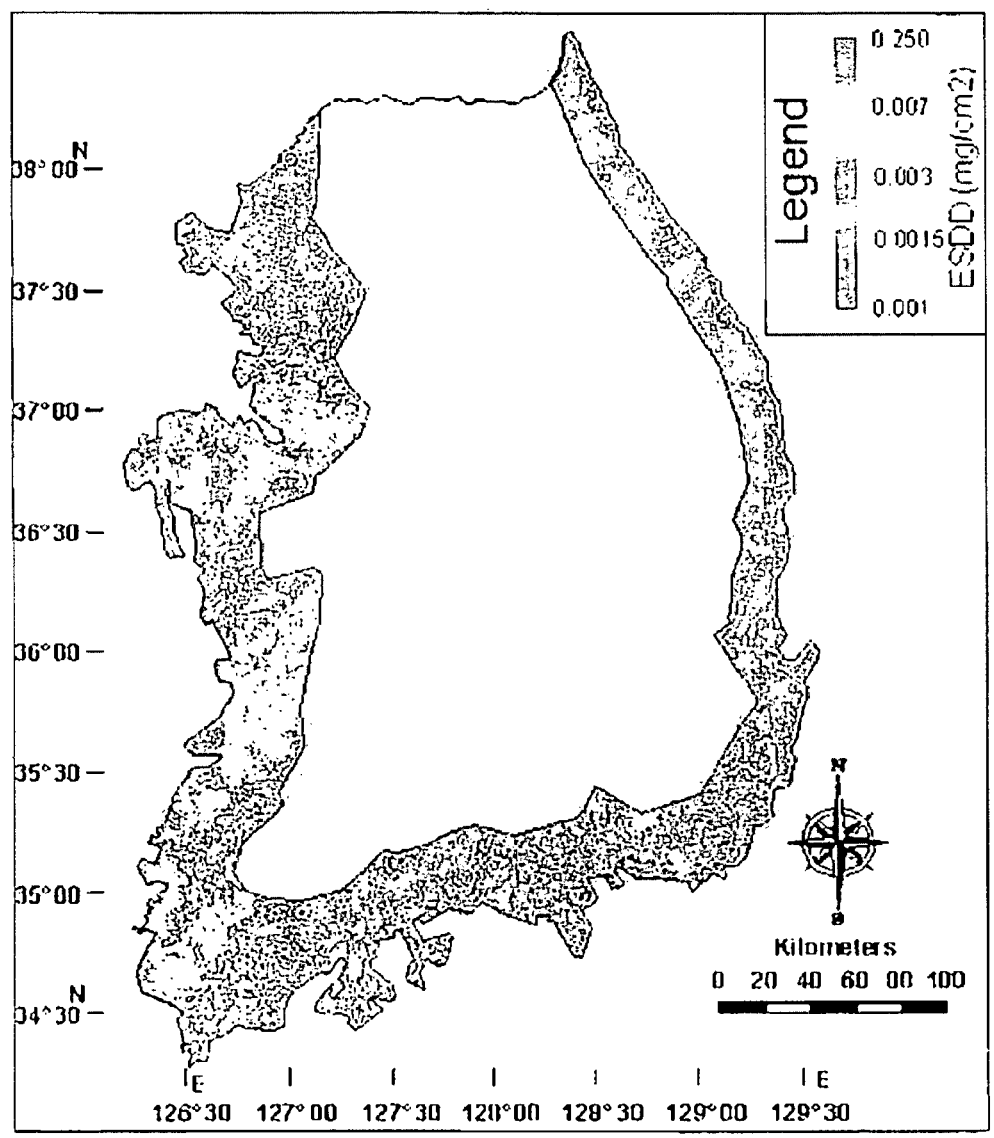
FIG. 13 is a map showing a contamination distribution manufactured by a decision making tree.

FIG. 13 is a map showing a contamination distribution manufactured by a decision making tree.

Referring to FIG. 13, a map is divided into 37,328 cells by dividing areas within 20 kilometers from the coast line into 1 kilometer cell unit. A geographical inclined angle, an altitude difference, a land cover classification, a geographical altitude at every 500 meters intervals are extracted to form database by using geographical factor extracting method mentioned the above at a center point of each pixel. The accumulated rainfall amount of the 40 mm is applied to the manufactured decision making tree, and the accumulated salt contamination at each positions is calculated. Thus, a distribution map may be made by each unit cell.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A computer-implemented method of estimating a salt contamination comprising:
    preparing salt contamination data measured at a plurality of areas;
    preparing geographical factor data of each of the plurality of areas;
    preparing rainfall amount data near each of the plurality of areas;
    setting, using computer logic, a correlation expression for relating the prepared salt contamination data to the prepared geographical factor data and the prepared rainfall amount data at each of the plurality of areas; and
    estimating, using the correlation expression set using the computer logic, salt contamination of one of the plurality of areas based on a measured rainfall amount for one area,
    wherein the step of preparing the geographical factor data comprises:
        setting a plurality of measuring points by dividing sections from a salt contamination measuring position to a coastal direction;
        measuring an altitude and an inclined angle at each measuring position;
        understanding a present condition of a land use near the measuring position; and
        setting the altitude, the inclined angle and the present condition of the land use as a geographical factor.

2. The Method of claim 1, wherein the salt contamination data comprises an equivalent salt deposit density (ESDD), which is measured at electric poles of a plurality of the areas.

3. The method of claim 2, wherein the ESDD is measured monthly at electric poles of a plurality of coastal areas disposed from a coast to an inland.

4. The method of claim 1, wherein the step of understanding a present condition of a land use near the measuring position comprises:
    setting data extracting area from a coast to inland;
    dividing the data extracting area into a plurality of cells; and
    understanding the present condition of the land use by using a geographical cover classifying map.

5. The method of claim 4, wherein the data extracting area comprises an area having a width of 20 kilometers from the coast to the inland.

6. The method of claim 5, wherein the cell is divided into a square measuring 1 kilometer each side.

7. The method of claim 1, wherein the step of preparing rainfall amount data near each of the plurality of areas comprises:
    selecting a plurality of observatories near the areas;
    measuring a rainfall of each observatory; and
    calculating a rainfall of the areas by using interpolation with the measured rainfall of each observatory.

8. The method of claim 7, wherein the rainfall comprises an accumulated rainfall from a month before a measuring date until the measuring date.

9. The method of claim 8, wherein an accumulated rainfall of 40 mm is applied to the correlation expression used for estimating the salt contamination.

10. The method of claim 1, wherein the correlation expression for relating the prepared salt contamination data to the prepared geographical factor data and the prepared rainfall amount data at each of the plurality of areas is set by using a decision making tree.

11. A computer-implemented method of estimating a salt contamination comprising:

preparing salt contamination data measured at a plurality of areas;

setting a section from a coast to an inland and dividing the set section into a plurality of cells;

preparing geographical factor data of each of the plurality of areas;

preparing rainfall amount data near each of the plurality of areas;

setting, using computer logic, a correlation expression for relating the prepared salt contamination data to the prepared geographical factor data and the prepared rainfall amount data at each of the plurality of areas;

estimating, using the correlation expression set using the computer logic, salt contamination of each of the plurality of cells based on a measured rainfall amount for the corresponding cell; and making a salt contamination distribution map by displaying the estimated salt contamination of each of the plurality of cells.

12. The method of claim 11, wherein the salt contamination data comprises an ESDD, which is measured monthly at electric poles of a plurality of coastal areas disposed from a coast to an inland.

13. The method of claim 12, wherein the step of preparing the geographical factor data comprises:

setting a plurality of measuring points by dividing sections from a salt contamination measuring position to a coastal direction;

measuring an altitude and an inclined angle at each measuring position;

understanding a present condition of a land use near the measuring position by using a geographical cover classifying map; and setting the altitude, the inclined angle and the present condition of the land use as a geographical factor.

14. The method of claim 13, wherein the step of preparing rainfall amount data near each of the plurality of areas comprises:

selecting a plurality of observatories near the areas;

measuring an accumulated rainfall of each observatory rainfall from a month before a measuring date until the measuring date; and calculating a rainfall of the areas by using interpolation with the measured rainfall of each observatory.

15. The method of claim 14, wherein the correlation expression for relating the prepared salt contamination data to the prepared geographical factor data and the prepared rainfall amount data at each of the plurality of areas is set by using a decision making tree.

16. The method of claim 15, wherein the step of setting the correlation expression further comprises:

applying a real salt contamination to the set decision making tree; and eliminating a branch having great error.

* * * * *